United States Patent
Ma et al.

(10) Patent No.: US 6,892,326 B2
(45) Date of Patent: May 10, 2005

(54) SYSTEMS AND METHODS FOR MONITORING OBJECT ACTIVITY THROUGH AN EXTERNAL AGENT USING A PROXY OBJECT

(75) Inventors: Ji Ma, Kirkland, WA (US); Tuan D. Le, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 488 days.

(21) Appl. No.: 10/105,066

(22) Filed: Mar. 22, 2002

(65) Prior Publication Data

US 2003/0182598 A1 Sep. 25, 2003

(51) Int. Cl.[7] .............................................. G06F 11/00
(52) U.S. Cl. .......................................... 714/38; 714/35
(58) Field of Search ...................................... 714/38, 35

(56) References Cited

U.S. PATENT DOCUMENTS

| | | | | |
|---|---|---|---|---|
| 5,884,316 A | * | 3/1999 | Bernstein et al. | 707/103 R |
| 6,085,030 A | * | 7/2000 | Whitehead et al. | 709/203 |
| 6,748,555 B1 | * | 6/2004 | Teegan et al. | 714/38 |
| 2002/0199035 A1 | * | 12/2002 | Christensen et al. | 709/330 |

* cited by examiner

*Primary Examiner*—Scott Baderman
*Assistant Examiner*—Joshua Lohn
(74) *Attorney, Agent, or Firm*—Lee & Hayes, PLLC

(57) ABSTRACT

Systems and methods are described for monitoring the activity of an object to aid in debugging a problem with an application using the object. An operating system registry is altered to reference a proxy object when the application attempts to reference the object. The proxy object exposes an interface exposed by the object. Communications passing between the application and the object can be monitored in the proxy object. The proxy object can be monitored locally or remotely through a remote procedure channel.

39 Claims, 5 Drawing Sheets

SYSTEMS AND METHODS FOR MONITORING OBJECT ACTIVITY THROUGH AN EXTERNAL AGENT USING A PROXY OBJECT

TECHNICAL FIELD

The systems and methods described herein relate to monitoring and debugging objects. More particularly, the described invention relates to systems and methods for monitoring activity of an object using a proxy object to debug a problem detected in the object.

BACKGROUND

With some particular applications, it may be difficult to debug one or more problems that are detected when the application is executed. This problem may be compounded when the application is user-configurable as it is difficult to determine if the problem lies with the application itself, with a user's configuration of the application, or with the application's environment, i.e., the operating system on which the application is running.

A typical way to debug an application is to install one or more special debugging files and activate debug logging while the application is executing so that data is collected in a log file. The log file can then be analyzed to identify the problem. This method can be time consuming and unreliable, especially if the identified problem only shows up in a particular environment. It is not uncommon that a developer trying to debug a problem is not associated with the users who have experienced the problem. The developer may have difficulty conceiving certain configuration aspects that are utilized by the users in particular environment configurations.

For example, a software package called DIRECTSHOW produced by MICROSOFT CORP. utilizes multiple user-configurable filters that are collectively referred to as a filter graph. If users of a DIRECTSHOW application experiences problems with the application, they typically rely on developers from MICROSOFT CORP. to identify the problem and provide a solution to the problem.

As it turns out, it is very difficult to determine which DIRECTSHOW filters are being used in the filter graph, how the filters communicate (or connect) with each other, and how the filter graph changes during the course of the application's lifetime. If such information could be collected quickly from an object within the application that controls filters used in the application, the developer would be better equipped to provide a clear solution to the problem.

SUMMARY

Systems and methods are described for monitoring activity of an object to debug a problem detected in the object. A proxy object is created that is called in place of the monitored object. This is done by modifying a registry entry in an operating system that controls execution of the application.

The proxy object processes the information it receives in the call and, in turn, calls the monitored object, passing in the same information that was passed to the proxy object when the proxy object was called. A remote procedure call (RPC) channel in the proxy object is used to monitor the activity of the object. At any time, information about the activity of the object can be output to a file, a display, a printer, etc. The information may be output through the RPC channel to a remote location, so a developer can debug an application from a remote site.

The existence and use of a proxy object as described herein is transparent to the monitored object, the application using the monitored object, and the operating system that controls the execution of the application.

BRIEF DESCRIPTION OF THE DRAWINGS

A more complete understanding of exemplary methods and arrangements of the present invention may be had by reference to the following detailed description when taken in conjunction with the accompanying drawings wherein.

DETAILED DESCRIPTION

Figure 1:
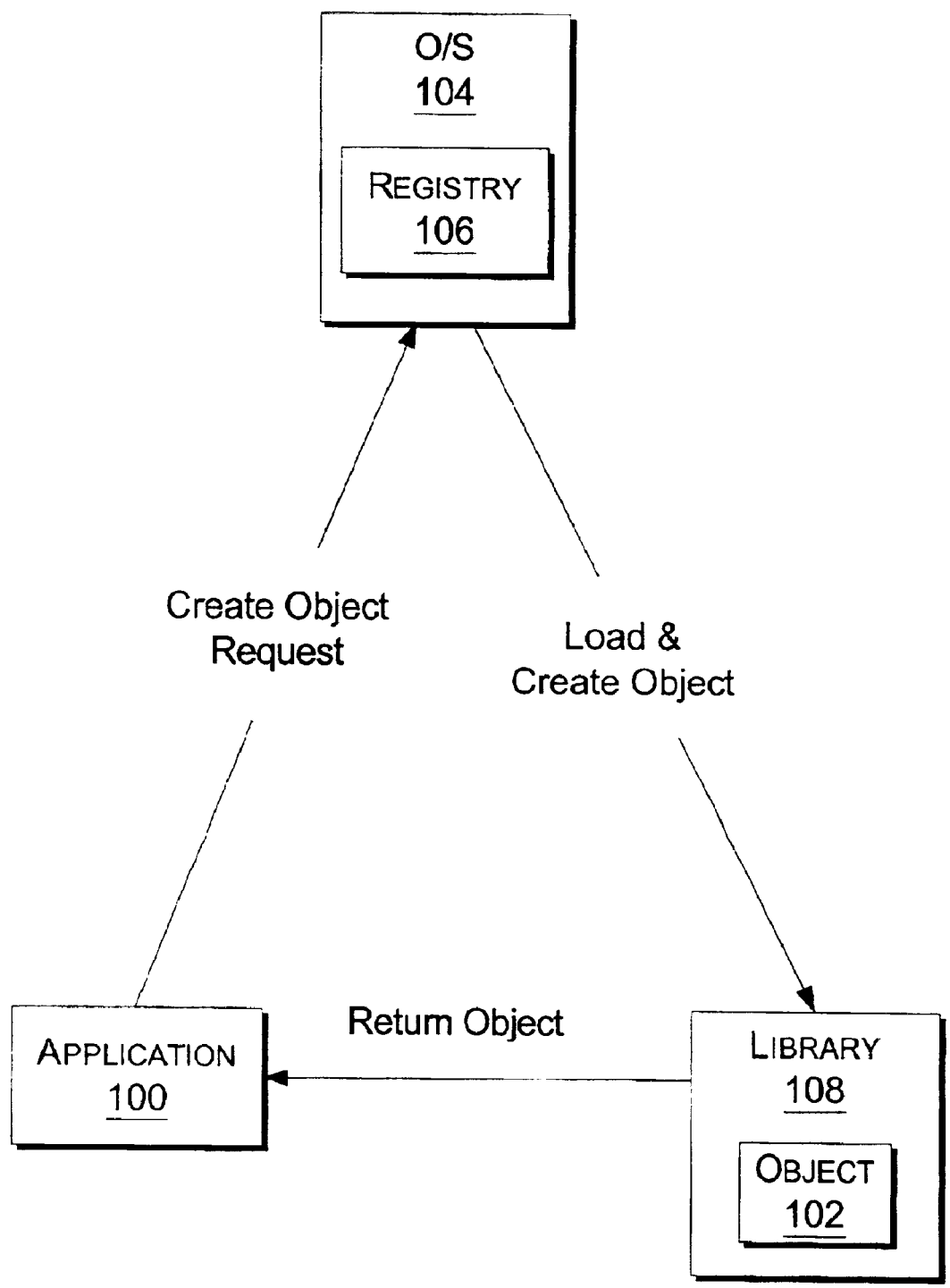
FIG. 1 is a block diagram depicting a prior art method that an application uses to create and use an object.

This invention concerns a systems and methods for monitoring object activity through an external agent using a proxy object. The invention described herein may be used to debug a problem in an application that utilizes the monitored object. An application using the present invention may be used in conjunction with one or more other applications to locally or remotely monitor object activity utilizing a proxy object. The present invention is may at times be described according to a particular implementation. However, it is noted that the features described herein may be applied to any computer system or application that utilizes an operating system registry or middle agent to create and load an object.

Computer-Executable Instructions/Modules

The invention is illustrated in the drawings as being implemented in a suitable computing environment. Although not required, the invention is described in the general context of computer-executable instructions, such as program modules, to be executed by a computing device, such as a personal computer or a hand-held computer or electronic device. Generally, program modules include routines, programs, objects, components, data structures, etc. that perform particular tasks or implement particular abstract data types. Moreover, those skilled in the art will appreciate that the invention may be practiced with other computer system configurations, including multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Prior Art

FIG. 1 is a block diagram depicting a prior art method that an application 100 uses to create and utilize an object 102. The application 100 sends a request to an operating system 104 for the operating system 104 to create the object 102. The operating system 104 checks a registry 106 in the operating system 104 to find a library 108 in which the object 102 resides. If the library 108 has been loaded and has registered with the operating system 104, then the registry 106 will the present example described herein, the communications module 216 is used to allow the external agent 202 to communicate with the computer system 200 and its components.

The computer system 200 also includes the application 208 that executes in conjunction with the operating system 222 that includes a registry 224. A library 226 is shown that includes the object 206 and has registered with the operating system 222. The proxy object 204 marshals data transmitted between the object 206 and the application 208. As data passes to and from the proxy object 204, the data may be monitored. The external agent 202 (e.g., an applet) is configured to redirect the registry 224 to the proxy object 204 and to control the proxy object 204.

It is noted that there may be more than one proxy object 204. In such a case, the proxy objects may be included in a container, such as a dynamically linked library, an executable, etc., for convenience purposes, although it is not necessary. A specific implementation using two proxy objects is described in detail below. Although the use of one proxy object and two proxy objects are described, it is noted that three or more proxy objects may be used.

Although the external agent 202 is shown as a remote object, it is noted that the external agent 202 may be included within the computer system 200. As long as the external agent 202 can communicate with the proxy object 204, the systems and methods can operate as described herein.

Although not required, the object 206 may conform to the Common Object Model (COM) standard. In COM terms, the object 206 is an aggregatable object. Aggregation is a way for a first COM object to reuse a second COM object by directly exposing interfaces of the second object to a client (i.e., an application) without wrapping the interfaces. As will be discussed in greater detail, below, the systems and methods described herein operate by the proxy object 204 obtaining one or more interfaces (not shown) of the object 206 and exposing the interface(s) to the application 208.

A remote procedure call (RPC) channel 228 is included in the proxy object 204. The RPC 228 enables the external agent 202 to communicate directly with the proxy object 204. The RPC 228 will be discussed in greater detail below. Although not shown in this example, the external agent 202 may also include an RPC (not shown) that communicates with the RPC 228 of the proxy object 204.

A benefit of the aggregation is that the proxy object 204 can monitor or control every aspect of the object 206 (method, interface, event, etc.). If the object 206 is procedurally destroyed by the application 208, the proxy object 204 receives notification before the object 206 is destroyed so that the proxy object 204 can release any reference on the object 206 and clean up properly. A beneficial effect of this property is that the proxy object 204 can perform a final inspection before it is destroyed.

As long as the properties attributed to aggregation as described above are exhibited by the object 206, then the systems and methods as described herein will function optimally. Further discussion of the elements shown in FIG. 2 will be described below with reference to the flow diagram of FIG. 3.

Remote Proxy Object Monitoring Methodology

Figure 2:
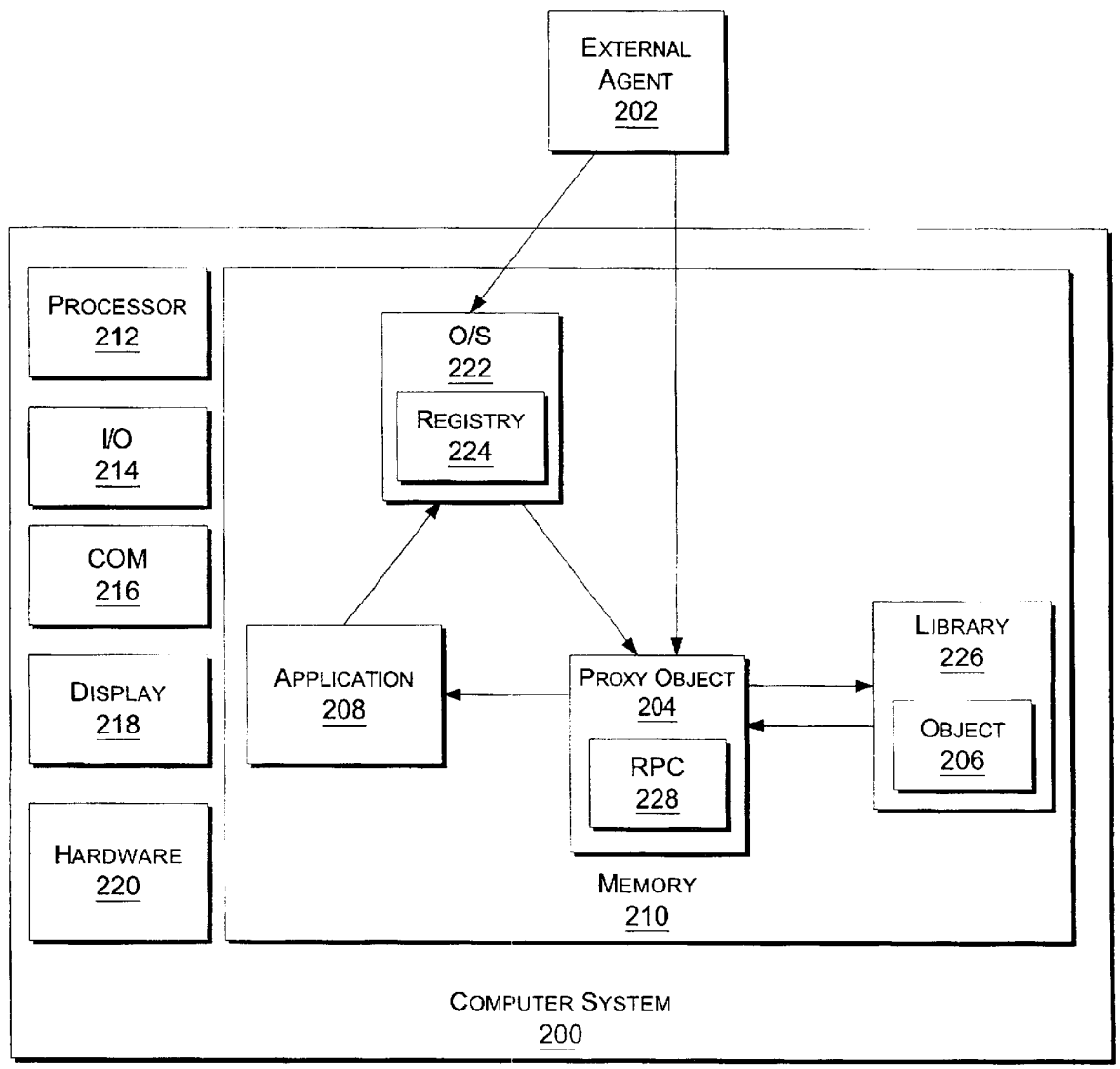
FIG. 2 is a block diagram of a computer system configured to allow an external agent to utilize a proxy object to monitor activity of an object used by an application.
Figure 3:
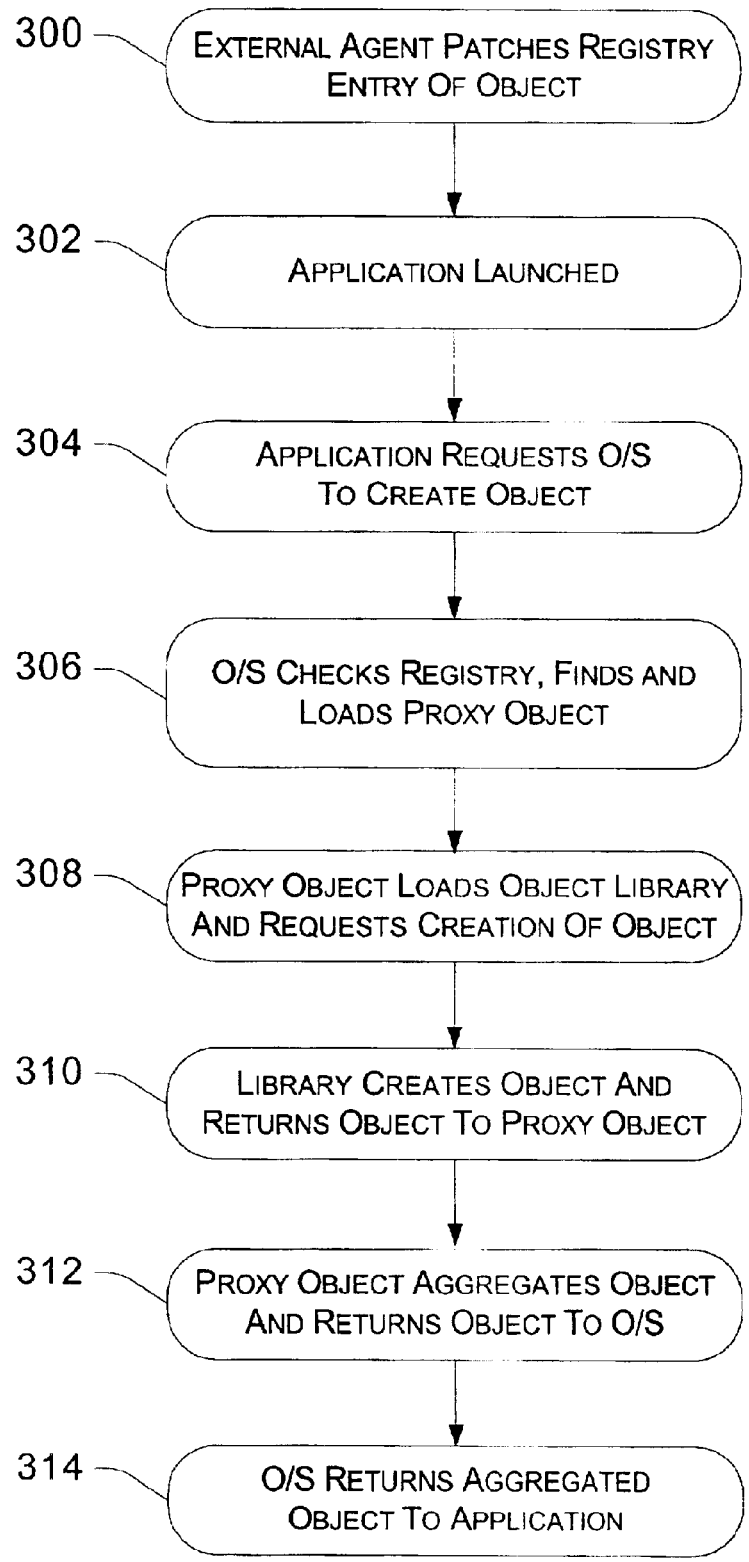
FIG. 3 is a flow diagram depicting a method for monitoring activity of an object with a proxy object.

FIG. 3 is a flow diagram depicting a method for monitoring activity of an object with a proxy object. In the discussion of FIG. 3, continuing reference will be made to the elements and reference numerals of FIG. 2.

At block 300, the external agent 202 patches the registry 224 of the operating system 222 before the application 208 is launched. The patch includes redirecting a registry entry (not shown) for the object 206 in the library 226 to reference the proxy object 204. The application 208 is then launched at block 302.

The application 208 requests the operating system 222 to create the object 206 at block 304. At block 306, the operating system 222 checks the registry 224 and is directed to find the object 206 at an address that actually points to the proxy object 204. The proxy object 204 is loaded and directly requests the library 226 to create the object 206 (block 308). At block 310, the library 226 creates the object 206 and returns the object 206 to the proxy object 204.

At block 312, the proxy object 204 aggregates the object 206 and returns the object 206 to the operating system 222. As described above, aggregating the object 206 merely entails the proxy object 204 exposing one or more object interfaces. The proxy object 204 obtains the interface(s) from the object 206 and exposes the same interfaces. The operating system 222 then returns the aggregated object 206 to the application 208 at block 314.

During execution of the application 208, when data passes from the application 208 to the object 206 or from the object 206 to the application 208, the data must pass through the proxy object 204. This provides an opportunity to monitor the data and, hence, the activity of the object 206 and the application's control of the object 206. The external agent 202 is used to control the monitoring of the data passed through the proxy object 204.

If the proxy object 204 is a COM object, then a convenient way to facilitate communication between the external agent 202 and the proxy object 204 is through the remote procedure call (RPC) channel 228 included in the proxy object 204. Alternatively, the monitoring may be performed by static code contained within the proxy object 204. However, use of the RPC 228 allows the data to be monitored locally or from a remote location. Also, the instances that are monitored and the conditions of the monitoring may be altered as needed.

Remote Proxy Object Monitoring—Specific Implementation

Figure 4:
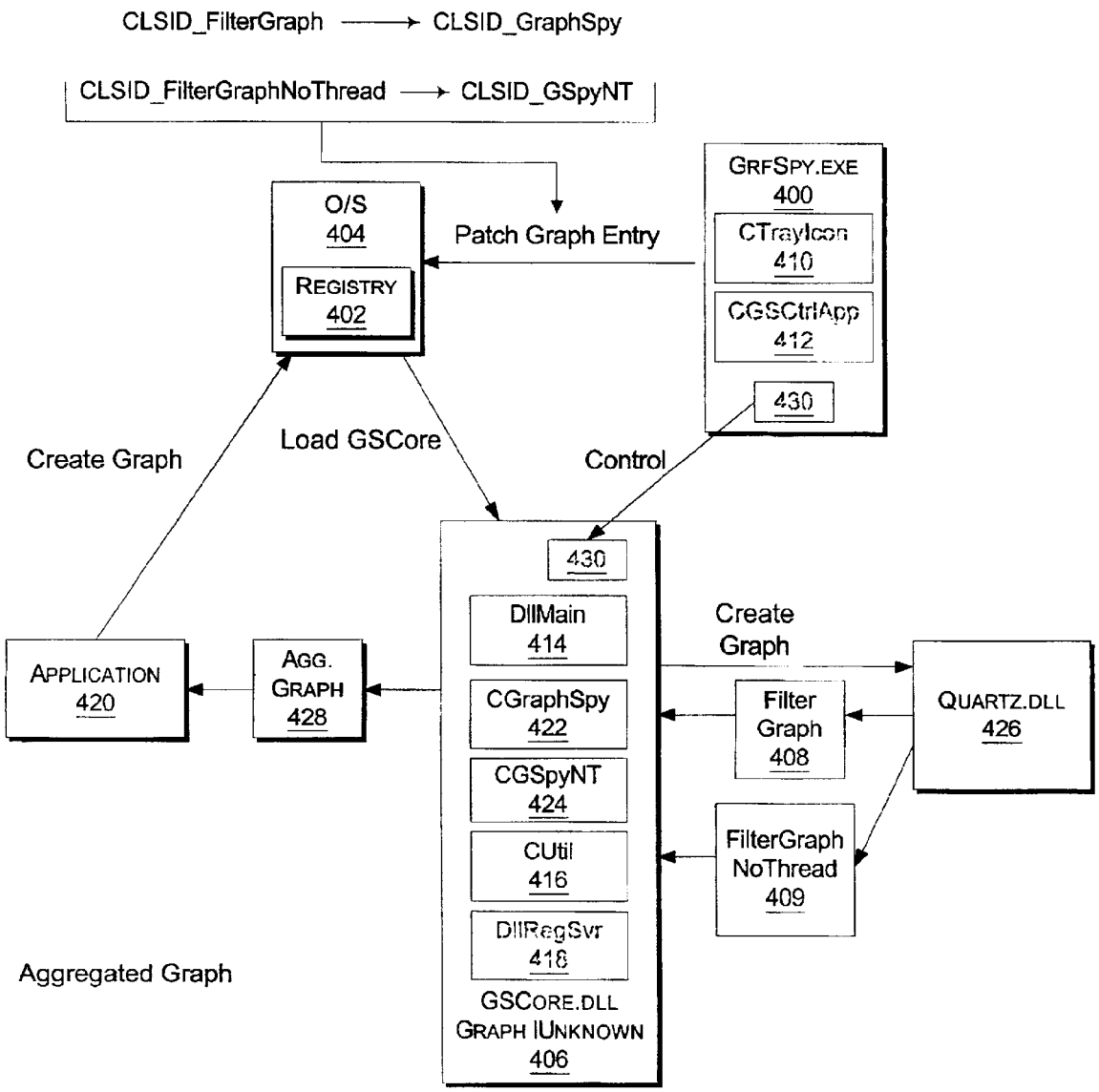
FIG. 4 is a block diagram depicting a particular implementation of the present invention.

FIG. 4 is a block diagram depicting a specific implementation of the claimed invention. The specific implementation shown in FIG. 4 is for monitoring graph data in a DIRECTSHOW application. Those skilled in the art will identify the implementation of the claimed features of the invention as described above in the following example.

An executing external agent 400 (grfspy.exe) patches a registry 402 in an operating system 404 for filter graph entries and registers filter graph proxy object container 406 (GSCore.dll) as an object factory for a filter graph 408. In the present example, the proxy object container is a dynamically linked library (DLL) file. It is noted, however, that the proxy object container does not necessarily have to be a DLL. It can be any container (e.g., an executable file, etc.) capable of encompassing one or more objects, including proxy objects.

The external agent 400 includes CTrayIcon 410 and CGSCtrlApp 412. Registry 402 entry CLSID_FilterGraph is mapped to CLSID_GraphSpy, and CLSID_FilterGraphNoThread is mapped to CLSID_GSpyNT. GSCore.dll 406 also includes DllMain 414, CUtil 416 and DLLRegSvr 418, all of which are helper objects that facilitate registration and operations of the proxy objects contained in GSCore.dll 406.

When an application 420 attempts to create a DIRECTSHOW filter graph, the operating system 404 loads GSCore.dll 406 by calling its DLL entry function, DllMain 414. When the application 420 requests to create the filter graph 408 and/or filter graph no thread 409, the operating system 404 checks the registry 402 and finds proxy object CGraphSpy 422 or CGSpyNT 424. In this example, CGraphSpy 422 and CGSpyNT 424 are proxy objects, and each functions similarly to the proxy object 204 described in FIG. 2. The application 420 is unaware that this action has taken place. Proxy object 422 or 424 loads the original filter graph object factory (included in quartz.dll 426) and requests it to create the filter graph 408 or filter graph no thread 409. Proxy object CGraphSpy 422 and/or CGSpyNT 424 aggregates the filter graph 408 and/or filter graph no thread 409 before handing over to the application 420.

Proxy object CGraphSpy 408 and CGSpyNT 409 include an IUnknown handle to the filter graph 408 and/or filter graph no thread 409 that the application 420 is using and can dump the graph content at any time when requested by the external agent (GrfSpy.exe) 400. In this example, it is noted that GrfSpy.exe 400 is implemented as a tray applet, although this is specific implementation is not required.

When the application 420 shuts down the filter graph 408 and/or filter graph no thread 409, proxy object CGraphSpy 422 and CGSpyNT 424 are notified and can, as a result, perform appropriate cleanup actions.

As noted previously, GSCore.dll 406 may be a COM object and, if so, includes a remote procedure call (RPC) channel 430. In this example, GrfSpy.exe 400 also includes an RPC 430 and GrfSpy.exe 400 and GSCore.dll 406 communicate via the RPCs 430.

EXEMPLARY COMPUTER ENVIRONMENT

Figure 5:
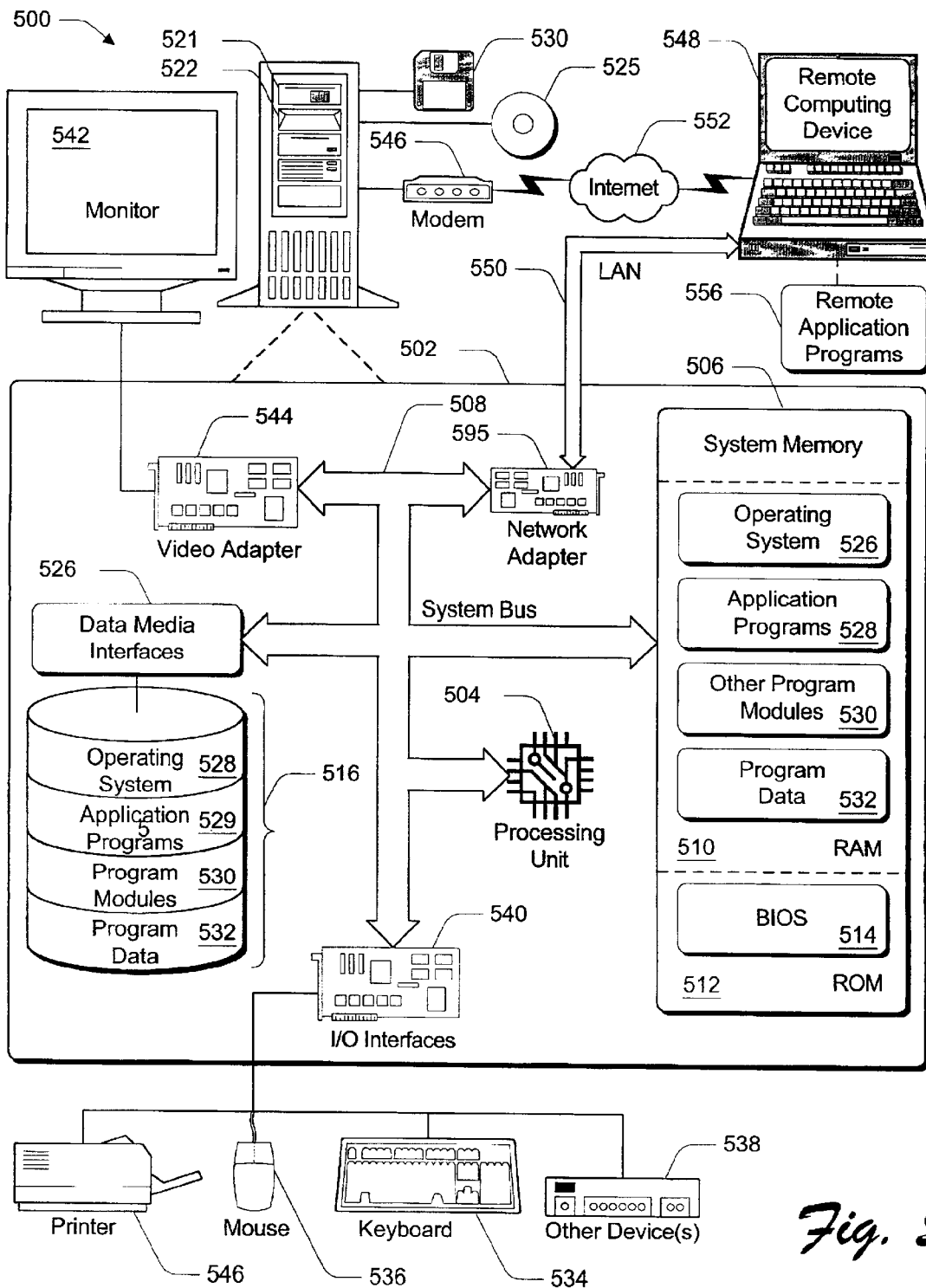
FIG. 5 is a diagram of an exemplary system on which the present invention may be implemented.

The various components and functionality described herein are implemented with a number of individual computers. FIG. 5 shows components of typical example of such a computer, referred by to reference numeral 500. The components shown in FIG. 5 are only examples, and are not intended to suggest any limitation as to the scope of the functionality of the invention; the invention is not necessarily dependent on the features shown in FIG. 5.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 5, the components of computer 500 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 500 typically includes a variety of computer-readable media. Computer-readable media can be any available media that can be accessed by computer 500 and includes both volatile and nonvolatile media, removable and non-removable media. By way of example, and not limitation, computer-readable media may comprise computer storage media and communication media. "Computer storage media" includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 500 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface such as interface 550.

The drives and their associated computer storage media discussed above and illustrated in FIG. 5 provide storage of computer-readable instructions, data structures, program modules, and other data for computer 500. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 500 through input devices such as a keyboard 562 and pointing device 561, commonly referred to as a mouse, trackball, or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port, or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer may operate in a networked environment using logical connections to one or more remote computers, such as a remote computer 580. The remote computer 580 may be a personal computer, a server, a router, a network PC, a peer device or other common network node, and typically includes many or all of the elements described above relative to computer 500, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets, and the Internet.

When used in a LAN networking environment, the computer 500 is connected to the LAN 571 through a network interface or adapter 570. When used in a WAN networking environment, the computer 500 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 500, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

CONCLUSION

The systems and methods as described thus provide a way to monitor object activity through an external agent utilizing one or more proxy objects. As a result, a problem identified in an application using the object may be easily debugged by analyzing monitored data. The changes made to accommodate the monitoring are transparent to the application using the object, the object and the operating system hosting the application.

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

What is claimed is:

1. A method for monitoring activity of an object, comprising:
   altering an operating system registry to reference a proxy object so that when an application references the object, the proxy object is referenced instead;
   monitoring data transmitted to and from the proxy object; and
   wherein the proxy object receives application data sent from the application to the object, forwards the application data to the object, receives object data sent from the object to the application, and forwards the object data to the application.

2. The method as recited in claim 1, further comprising creating the proxy object.

3. The method as recited in claim 1, wherein the monitoring further comprises monitoring the data transmitted to and from the proxy object further comprises remotely monitoring the data transmitted to and from the proxy object.

4. The method as recited in claim 1, wherein the proxy object further comprises a remote procedure channel (RPC) through which the data is monitored.

5. The method as recited in claim 1, wherein the object further comprises an aggregatable object.

6. The method as recited in claim 1, wherein the object further comprises a common object model (COM) object.

7. The method as recited in claim 1, wherein the monitoring the data further comprises storing the data on one or more computer-readable media.

8. The method as recited in claim 1, wherein the monitoring the data further comprises printing the data.

9. The method as recited in claim 1, wherein the monitoring the data further comprises displaying the data on an electronic display.

10. The method as recited in claim 1, wherein the proxy object does not alter normal activity of the application or the object.

11. A system, comprising:
an operating system having a registry;
a library that includes an object;
a proxy object configured to monitor activity of the object; and
wherein the operating system registry redirects application data from an application to the object to the proxy object before the proxy object forward the application data to the object thereby allowing an opportunity for the application data to be monitored in the proxy object.

12. The system as recited in claim 11, wherein the proxy object further comprises a remote procedures channel that allows an external agent to monitor data passing through the proxy object.

13. The system as recited in claim 12, wherein the external agent monitors the proxy object from a remote location.

14. The system as recited in claim 11, further comprising an external agent configured to patch the operating system registry to redirect the data from the application and to monitor the data passing through the proxy object.

15. The system as recited in claim 11, wherein the object further comprises an aggregatable object.

16. The system as recited in claim 11, wherein the object further comprises a common object model (COM) object.

17. The system as recited in claim 11, wherein the proxy object is further configured to receive object data sent from the object to the application and to forward the object data to the application thereby providing an opportunity to monitor the object data in the proxy object.

18. One or more computer-readable media containing computer-executable instructions that, when executed on a computer, perform the following steps:
altering an operating system registry to redirect application data sent from an application to an object;
receiving the redirected application data at a location other than the intended object;
forwarding the redirected application data to the object;
receiving object data sent from the object to the application;
forwarding the object data to the application; and
outputting the application data and the object data to an external agent.

19. The one or more computer-readable media as recited in claim 18, wherein the outputting step further comprises the external agent reading the application data and the object data.

20. The one or more computer-readable media as recited in claim 18, wherein the outputting step further comprises outputting the application data and the object data via remote procedures channel (RPC).

21. The one or more computer-readable media as recited in claim 18, wherein the external agent is a common object model (COM) object.

22. The one or more computer-readable media as recited in claim 18, wherein the outputting further comprises outputting the application data and the object data to a remote location.

23. The one or more computer-readable media as recited in claim 18, wherein:
the steps are performed in a computer system; and
the outputting further comprises outputting the application data and the object data to an object within the computer system.

24. One or more computer-readable media containing computer-executable instructions that, when executed on a computer, perform the following steps:
altering an operating system registry so that when an application references an object, the operating system redirects the references to a proxy object;
monitoring data that passes through the proxy object; and
wherein the proxy object receives application data from the application to the object, forwards the application data to the object, receives object data from the object to the application and forwards the object data to the application.

25. The one or more computer-readable media as recited in claim 24, wherein the altering is performed prior to the application being launched.

26. The one or more computer-readable media as recited in claim 24, wherein the proxy object is a component object model (COM) object.

27. The one or more computer-readable media as recited in claim 24, wherein the monitoring the data that passes through the proxy object further comprises monitoring the data that passes through the proxy object by way of a remote procedures channel included in the proxy object.

28. The one or more computer-readable media as recited in claim 24, wherein the object further comprises an aggregatable object.

29. The one or more computer-readable media as recited in claim 24, wherein neither the proxy object nor the external agent nor the actions thereof affect the normal operation of the application and the object.

30. A method for monitoring activity of an object, comprising:
configuring a proxy object to intercept data that passes to and from the object and to and from an application that uses the object;
configuring an operating system registry that handles activity between the application and the object to reference the proxy object when the application references the object; and
monitoring data that passes to and from the proxy object.

31. The method as recited in claim 30, wherein:
the proxy object further comprises a common object model (COM) object having a remote procedures channel; and
the monitoring data further comprises remotely monitoring the data via the remote procedures channel.

32. The method as recited in claim 30, wherein the configuring the proxy object further comprises configuring the proxy object to expose an object interface for the application to utilize, the object interface being an interface exposed by the object.

33. The method as recited in claim 30, further comprising creating the proxy object.

34. The method as recited in claim 30, wherein the configuring the operating system registry occurs prior to the application being launched.

35. The method as recited in claim 30, wherein the object further comprises an aggregatable object.

36. The method as recited in claim 30, wherein the object further comprises a COM object.

37. The method as recited in claim 30, wherein the monitoring data further comprises storing the data on one or more computer-readable media.

38. The method as recited in claim 30, wherein the monitoring data further comprises printing the data.

39. The method as recited in claim 30, wherein the monitoring data further comprises displaying the data on at least one electronic display.

* * * * *

UNITED STATES PATENT AND TRADEMARK OFFICE
CERTIFICATE OF CORRECTION

| | | |
|---|---|---|
| PATENT NO. | : 6,892,326 B2 | Page 1 of 1 |
| APPLICATION NO. | : 10/105066 | |
| DATED | : May 10, 2005 | |
| INVENTOR(S) | : Ma et al. | |

It is certified that error appears in the above-identified patent and that said Letters Patent is hereby corrected as shown below:

On Sheet 1 of 5, in Fig 1, line 1, delete "Fig 1" and insert -- Fig. 1 --, therefor.

On Sheet 2 of 5, in Fig 2, line 1, delete "Fig 2" and insert -- Fig. 2 --, therefor.

On Sheet 3 of 5, in Fig 3, line 1, delete "Fig 3" and insert -- Fig. 3 --, therefor.

On Sheet 4 of 5, in Fig 4, line 1, delete "Fig 4" and insert -- Fig. 4 --, therefor.

Signed and Sealed this

Seventh Day of April, 2009

JOHN DOLL
*Acting Director of the United States Patent and Trademark Office*